Patented Aug. 22, 1944

2,356,718

UNITED STATES PATENT OFFICE 2,356,718

CATIONIC AMINOTRIAZINE-ALDEHYDE RESIN SOLUTIONS

Henry P. Wohnsiedler, Darien, and Walter M. Thomas, Stamford, Conn., assignors to American Cyanamid Company, New York, N. Y., a corporation of Maine No Drawing. Application October 25, 1943, Serial No. 507,626

3 Claims. (Cl. 260—29)

This invention relates to compositions containing aminotriazine-aldehyde condensation products, and more particularly to colloidally dispersed guanamine-formaldehyde resins having novel characteristics.

We have discovered that guanamine-formaldehyde condensation products, when prepared in the presence of definite quantities of free acid or subsequently reacted with these same quantities of acid after their preparation by other methods, can be converted into colloidal dispersions wherein positive electrical charges are carried by the colloidal particles of the resin. In this condition the resin solutions or colloidal dispersions exhibit several unusual properties of commercial importance, and particularly the property of migration of the resin particles toward the cathode upon electrophoresis of the dispersion.

The colloidal solutions or dispersions of our invention are prepared by first reacting guanamine with aqueous formaldehyde solution, using preferably more than 3 molecular proportions of formaldehyde for each mol of guanamine, in the presence of sufficient acid to bring the pH of the reaction mixture within the range of 0.5 to about 3.5. Alternatively, guanamine-formaldehyde resins prepared by any other method, as by reacting guanamine with formaldehyde under slightly acid, neutral or alkaline conditions, may be mixed with sufficient acid to reduce the pH to the range defined above. We greatly prefer to employ strong mineral acids for these purposes, best results being obtainable with the common acids such as hydrochloric acid, phosphoric acid, nitric acid, sulfuric acid, etc. However, strong organic acids such as chloracetic acid, maleic acid and the like may be employed if desired.

After the acid resin solutions having the requisite pH of 0.5 to about 3.5 have been obtained they are allowed to age, preferably at room temperatures. We have discovered that when these solutions are allowed to stand at ordinary temperatures the guanamine-formaldehyde condensation proucts will undergo a progressive polymerization that is characterized by a gradual increase in the size of the resin particles until the colloidal range is reached. In this range the degree of polymerization of the resin is less than that which characterizes gels and precipitates that are undispersible by agitation with water but sufficient to impart definite colloidal characteristics to the resin particles. When this condition has been attained the partially polymerized guanamine-formaldehyde resin particles carry a positive electrical charge, as is shown by their migration toward the cathode upon electrophoresis of the solution. This is an extremely important property in a solution of a heat-curable thermosetting resin, for it provides a ready method of obtaining a controlled deposition of the resin in extremely thin layers on metallic surfaces and also on negatively charged materials such as cotton, viscose, rayon, paper pulp and other cellulosic fibers, non-fibrous cellulose and the like.

It is well known that the guanamines are 4,6-diamino 1,3,5-triazines having either hydrogen or a hydrocarbon radical attached to the 2-carbon atom, and any compound of this class may be used as a starting material in preparing the colloidal solutions of the present invention. Typical examples are formoguanamine, acetoguanamine, propionoguanamine, 4-N-methyl-2-acetoguanamine, 4-N-ethyl-2-acetoguanamine and the like. Higher guanamines such as butyroguanamine, octanoguanamine or lauroguanamine may also be used.

The colloidal guanamine-formaldehyde resin particles of the present invention contain about 2–4 mols of combined formaldehyde for each mol of guanamine. When insufficient formaldehyde is used to form a condensation product containing at least 2 mols of combined formaldehyde a water-insoluble slurry is formed that cannot be converted into a colloidal solution. Ordinarily it is preferable to employ an excess of formaldehyde over than theoretically necessary to combine with the guanamine in the desired ratio of 2–4:1, since water-soluble products are more readily obtained under these conditions. Accordingly, about 3–10 or more mols of aqueous formaldehyde solution are preferably employed for each mol of guanamine in the initial condensation.

The elapsed time necessary for ageing a clear solution of acidified guanamine-formaldehyde condensation products to the colloidal condition in which they carry a positive electrical charge is dependent upon the ageing conditions. In general, the ageing process is shortened by increasing either in temperature or the concentration of the acid resin solution, or both. Thus, for example, solutions having a solids content of about 44% which will form the colloid in 24 hours will require from 36 to 42 hours for colloid formation if diluted to 20% solids. However, the colloid is formed in about 24 hours in the 20% solution if the ageing is conducted at 40–50° C. instead of at 20–25° C. The ageing period may also be shortened by decreasing the amount of acid present in the solution.

The formation of a colloidal solution is shown in the first instance by the presence of a definite Tyndall effect under the influence of a beam of light or in the dark field microscope. Although the colloidal solution is infinitely dilutable with water it is extremely acid-sensitive, and this constitutes a very delicate test to determine whether any colloidal acid-type resin is present. When a strong acid such as 6N hydrochloric acid is added to a clear acidified resin solution that has not been aged no immediate change occurs, but when the acid resin solution has been aged for a time sufficient to bring even a small part of the resin particles within the colloidal range these particles are precipitated by the addition of the acid. This reaction with strong acids can be used to estimate the degree of polymerization of the resin solution since the amount of acid necessary for precipitation becomes less with increasing age of the solution.

Although the physical appearance and the addition of strong mineral acid are useful methods of identifying the colloidal solutions of partially polymerized guanamine-formaldehyde resins of the present invention, the most comprehensive test consists in the passage of a direct current of electricity through the solution. When the solutions of the present invention are subjected to electrophoresis in this manner the existence of a definite positive electrical charge is shown by the migration of the colloid resin toward the cathode. The cataphoresis is preferably carried out by passing a direct current of 90–120 volts through platinum electrodes immersed in the colloidal solution.

The invention will be illustrated in greater detail by the following specific examples. It should be understood, however, that these examples are given primarily for purposes of illustration, and that the invention in its broader aspects is not limited thereto.

*Example 1*

A mixture of 1 mol of acetoguanamine, 3 mols of aqueous formaldehyde solution and 1 mol of HCl was refluxed at 48% solids for 1.5 hours at atmospheric pressures. The resulting solution had a glass electrode pH of 0.9, contained approximately 2.5 mols of combined formaldehyde and was stable for one week at room temperature. After ageing for one day it showed a positive charge when subjected to electrophoresis as described in Example 2.

*Example 2*

A portion of the one-day old colloidal solution described in Example 1 was filled into a U-tube with an electrode inserted into each arm and the solution was covered with a layer of clear distilled water. A direct current of 120 volts potential was applied to the electrodes, each of which had an area of approximately 1 square inch.

Upon continued passage of the current through the solution the resin exhibited a positive charge and after several hours there was a definite migration to the cathode.

*Example 3*

A reaction mixture containing 1 mol of acetoguanamine, 6 mols of aqueous formaldehyde solution and 1 mol of hydrochloric acid was heated to boiling under reflux for 1.5 hours at 44% solids. The solution was then found to contain 2.7 mols of uncombined formaldehyde, indicating that 3.3 mols had combined with the guanamine. This solution was aged at a pH (glass electrode) of 0.8 for 24 hours at room temperature and then showed a positive charge when tested as described in Example 2. It was stable for about 6 days.

*Example 4*

A reaction mixture containing 209 grams (1 mol) of octanoguanamine, 648 grams (8 mols) of 37% aqueous formaldehyde and 100 grams of C. P. hydrochloric acid was heated at 70° C. for about 12–15 minutes with vigorous stirring, after which sufficient hot water was slowly added with continued agitation to dilute the reaction product to 20% solids. The resulting solution had a glass electrode pH of 0.8 and was aged for two days at room temperature after which it was found to possess cationic properties.

A portion of the aged solution was diluted with water to 5% resin solids and cotton percale was soaked with this solution. The cloth was then run through a bath of warm water, dried by heating for 5 minutes at 250° F. and cured for 3 minutes at 300° F. The cloth was then found to possess water-repellent properties.

*Example 5*

9 cc. of glacial acetic acid was mixed with 21.1 grams (0.05 mol) of dimethylol stearoguanamine which was then diluted to 10% non-acid solids and heated at reflux temperatures for 5–15 minutes. A milky solution was obtained which remained milky on cooling. This solution was stable for several months, but finally set to a soft gel. After ageing for two weeks it was found to possess cationic properties.

A portion of the aged colloidal solution was added to an 0.5% water suspension of kraft paper stock, using 5% resin solids on the dry weight of the paper fibers together with 1% of alum, and the stock was then formed into paper in the usual manner. The paper was found to contain 2.16% resin, this being a 43% retention. The treated paper possessed definite water-repellent properties when tested on the Currier slack size tester.

This is a continuation-in-part of our copending application Serial No. 453,120 filed July 31, 1942, now Patent No. 2,345,543.

What we claim is:

1. A colloidal aqueous solution of a partially polymerized positively charged guanamine-formaldehyde condensation product having a pH value within the range of about 0.5 to about 3.5, said condensation product containing about 2–4 mols of combined formaldehyde for each mol of guanamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

2. A colloidal aqueous solution of a partially polymerized, positively charged guanamine-formaldehyde condensation product, said solution containing sufficient strong mineral acid to maintain a pH value within the range of 0.5–3.5, said condensation product containing about 2–4 mols of combined formaldehyde for each mol of guanamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

3. A colloidal aqueous solution of a partially polymerized, positively charged acetoguanamine-formaldehyde condensation product, said solution containing sufficient strong mineral acid to maintain a pH value within the range of 0.5–3.5, said condensation product containing about 2–4 mols of combined formaldehyde for each mol of acetoguanamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution.

HENRY P. WOHNSIEDLER.
WALTER M. THOMAS.